Aug. 19, 1930.  E. B. GUZE  1,773,483
SCREW DRIVER
Filed Feb. 3, 1928
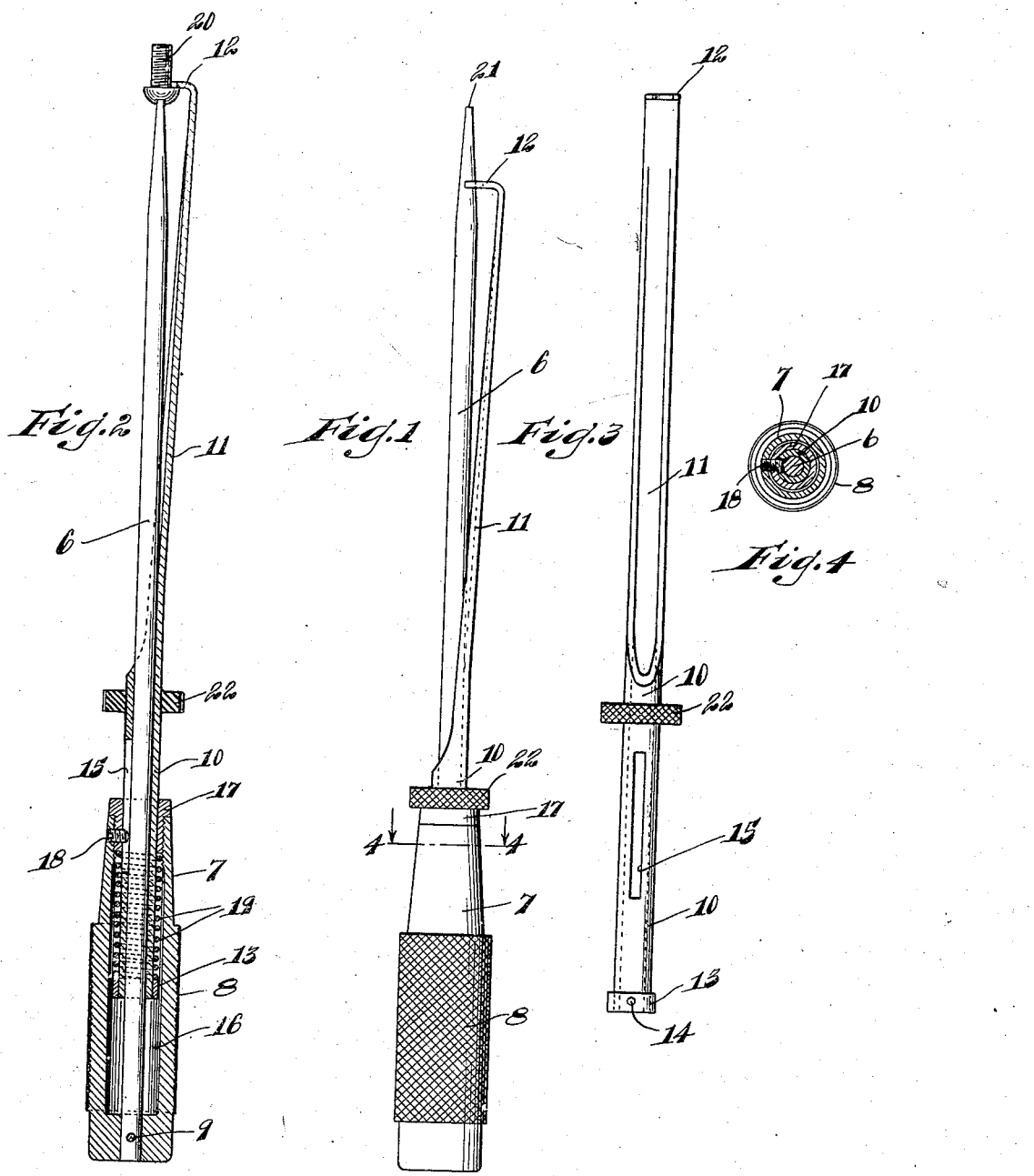
Witnesses:
E. E. Wessels
H. J. West
Inventor:
Emil B. Guze,
By Joshua R. H. Hook
his Attorney.

Patented Aug. 19, 1930

1,773,483

UNITED STATES PATENT OFFICE

EMIL B. GUZE, OF CHICAGO, ILLINOIS

SCREW DRIVER

Application filed February 3, 1928. Serial No. 251,504.

My invention relates to an improvement in a screw driver, and has for its object the provision of a screw driver suitable for driving screws in inaccessible holes where it is impossible to hold and guide the screw with the left hand while the right hand manipulates an ordinary screw driver. A further object is to produce a tool which is economical in construction, compact in arrangement and efficient for the work which it is to perform. Other objects will appear hereinafter. The invention consists in the combinations and arrangements of parts hereinafter described and claimed.

The invention will be best understood by reference to the accompanying drawing forming a part of this specification, in which Figure 1 is an elevational view of the screw driver embodying the invention.

Figure 2 is an elevation of the screw driver showing the handle and the screw holder in section.

Figure 3 is an elevational view of the screw holder separate from the screw driver.

Figure 4 is a section of the line 4—4 of Figure 1.

In the preferred form, as illustrated in the drawing, 6 represents the shank of a screw driver of the usual form, to which is affixed a hollow handle 7 by means of a rivet 9. The handle 7 is preferably made of metal, and is provided with a knurled portion 8 to provide a firm gripping area. Within the handle is a chamber 16 of greater diameter than the shank 6, extending throughout the major portion of the length of the handle 7 and partially closed by the retainer bushing 17.

The screw holder is preferably made of metal and comprises a tubular portion 10 which is sliced longitudinally to form a substantially channeled shaped portion 11 of about twice the length of the tubular portion, the whole being of somewhat less length than the shank 6 of the screw driver. The channel shaped portion 11 is increasingly shallow as it approaches the end, and at the end is formed a bifurcated member or claw 12, made by bending the end of the channel portion 11 at right angles to its length. The space between the claws is wide enough to accommodate the shank 6 of the screw driver, as clearly indicated in Figure 1. To the tubular portion 10 of the screw holder is affixed a collar 13, fastened thereto by the rivet 14. In one side of the tubular portion 10 is formed a longitudinal slot 15, the function of which is hereinafter explained. Adjacent to the point where the tubular portion 10 is cut and flattened to form the channel shaped portion 11, a knurled collar 22 is pressed onto the tubular portion 10, and serves as a handle by means of which the screw holder is controlled, and also as a stop to limit motion of the screw holder as hereinafter described.

The tubular portion 10 of the screw holder and its associated collar 13 fit within the chamber 16, already described, in the handle 8 of the screw driver. It is held therein by means of the retainer bushing 17, which is threaded and screwed into the opening of the chamber 16. The retainer bushing 17 is made a loose fit on the tubular portion 10 and permits the screw holder to be moved out and in along the shank 6 of the screw driver. A screw 18 passes through the wall of the handle 7 and enters the slot 15, thereby preventing any rotary movement of the screw holder about the shank 6, but permitting, and at the same time limiting, the reciprocating motion of said screw holder. A coiled spring 19 encircles the tubular portion 10 within the chamber 16, one end of which is seated against the collar 13, and the other end of which is seated against the retainer bushing 17, so that said spring 19 is compressed when the screw holder is pushed out and tends to draw the screw holder back until the collar 22 rests against the retainer bushing 17 when released.

In use pressure is applied to the knurled collar 22, moving the screw holder out along the shank 6 until the claw 12 extends beyond the edge 21 of the screw driver. The head of a screw 20 is placed in the claw 12 as shown in Figure 2, the edge 21 of the screw driver being inserted in the slot in the screw head, and the collar 22 released. The pressure exerted by the spring 19 on the screw holder holds the screw 20 firmly against the edge 21 of the screw driver. The screw and screw driver may then be inserted into a narrow space and the screw fitted into a screw hole and turned until the thread catches. The screw holder is then disengaged from the screw head by again pressing on the knurled collar 22, and when said collar is released the screw holder moves back, under the pressure of the spring 19 to the position shown in Figure 1. The screw driver is then employed in the usual manner for tightening the screw in its hole.

While I have illustrated and described the preferred form of the construction for carrying my invention into effect, it is capable of variation and modification without departing from the spirit of the invention. I, therefore, do not wish to be limited to the precise details of construction set forth, but desire to avail myself of such variations and modifications as come within the scope of the appended claim.

Having described my invention what I claim as new and desire to secure by Letters Patent is:

In combination with a screw driver having a hollow handle, a screw holder having a shorter tubular portion embracing the shank of said screw driver, and a longer channel shaped portion integral with said tubular portion partially embracing said shank; said tubular portion movably retained within said hollow handle by means of a collar affixed to said tubular portion and a retainer bushing fitted into the end of said handle; means to guide and limit the motion of said screw holder and to releasably hold said bushing in place; a coiled spring between said collar and said bushing; a collar affixed to said tubular portion adjacent the channel portion; and a claw on the end of said channel portion adjacent the end of said screw driver substantially as described.

In testimony whereof I have signed my name to this specification.

EMIL B. GUZE.